United States Patent [19]

Livingston

[11] Patent Number: 4,594,702
[45] Date of Patent: Jun. 10, 1986

[54] FLUID BEARING FOR AXIALLY MOVABLE HEAD

[75] Inventor: Rodney S. Livingston, Long Beach, Calif.

[73] Assignee: Discovision Associates, Costa Mesa, Calif.

[21] Appl. No.: 440,936

[22] Filed: Nov. 12, 1982

[51] Int. Cl.⁴ ............................................. G11B 21/10
[52] U.S. Cl. ...................... 369/45; 350/255; 360/102
[58] Field of Search ................. 360/102, 103; 369/45, 369/111, 112, 269; 350/247, 252, 255, DIG. 1; 308/5 R

[56] References Cited

U.S. PATENT DOCUMENTS

| | | | |
|---|---|---|---|
| 3,600,065 | 8/1971 | Law et al. ............................ | 350/247 |
| 4,006,294 | 2/1977 | Canino ............................... | 360/103 X |
| 4,030,815 | 6/1977 | Andreoski et al. ................. | 350/255 |
| 4,071,854 | 1/1978 | Bijon et al. ........................ | 360/102 X |
| 4,153,341 | 5/1979 | Kawamura et al. ................. | 350/255 |
| 4,422,169 | 12/1983 | Vitale et al. ...................... | 369/45 |

Primary Examiner—Aristotelis M. Psitos
Attorney, Agent, or Firm—Ronald J. Clark

[57] ABSTRACT

Method and means for supporting an optical read or write head to maintain a constant spacing between the head and a moving information storage medium. A major drawback in the prior art head assemblies incorporating pneumatic forcing pistons concerns the chattering, or lateral and axial vibrations, of the lens assembly relative to the housing due to the turbulent airflow in the passageway leading from the annular chamber to the atmosphere. The present invention provides a lens assembly/housing arrangement in which substantial axial support for the lens assembly within the housing is obtainable simultaneously with eliminating the turbulent air flow by increasing the axial width verses gap width ratio. Basically, the invention involves an annular pressure chamber provided between air journal bearings at each end of the housing. Air pressure in the annular chamber is regulated to provide a stable but variable biasing force on the inner lens assembly relative to the housing in a direction opposite that of a relatively fixed opposing biasing force.

17 Claims, 5 Drawing Figures

FLUID BEARING FOR AXIALLY MOVABLE HEAD

BACKGROUND OF THE INVENTION

1. Field of the Invention

The present invention relates to a fluid bearing head for use in information recording and/or retrieval apparatus, and more particularly, to a method and means for supporting an optical read or write head to maintain a constant spacing between the head and a moving information storage medium.

2. Description of the Prior Art

In the design and construction of an optical record and/or playback system, it is necessary to maintain a constant spacing between the read or write head and the recording medium in order to, in turn, maintain proper focus of the light beam impinging the surface of the medium. In a videodisc system, for example, information is recorded on a disc as a series of irregularities, each approximately 0.6 microns in width, and arranged in a spiral track with adjacent tracks being spaced apart by approximately 1.5 microns center to center. As noted in U.S. Pat. No. 3,914,541, issued Oct. 21, 1975 to James E. Elliott, the problem of optically resolving irregularities of such dimensions requires that the focus of the optical system be maintained so as to keep the diameter of the focussed spot to within a fraction of a micron.

One method of maintaining a constant disc-to-head spacing for an optical read head is described in U.S. Pat. No. 3,894,180, issued July 8, 1975 to Lawrence S. Canino. As described in the Canino patent, the reading of information recorded on a disc is through the use of a transducer head assembly placed adjacent the disc and which, along with the disc, is immersed in a fluid, (typically air) thus creating a fluid bearing between the assembly and the disc. As is further described in the Canino patent, the spacing maintained between the assembly and the disc can be kept substantially constant by means of a source of fluid at a variable controllable pressure, and a pressure regulator including a fluid flow restrictor which responds to changes in separation between the assembly and the disc and modifies the fluid pressure applied to the head.

Another Canino U.S. Pat. No. 4,006,294, issued Feb. 1, 1977 describes an improved transducer head assembly having a pair of expandable chambers which are coupled to each other through a fluid restrictor and which carries the transducer head, the expandable chambers being sensitive to pressure changes and causing the transducer head to move toward and away from the surface in response to such changes to correct the fluid flow pressure.

In both Canino patents, the forces exerted on the read head by the pressures within the chambers act directly on the entire resiliently suspended read head. This results in substantial mass and weight for such a read head reducing the ability of the head to respond to quick spacing changes between the head and the disc surface.

Other systems providing fluid bearings which afford a noncontact support for the entire disc and a read head and which utilize a negative pressure differential in the vicinity of the head may be found by a reference to U.S. Pat. No. 3,914,541, issued Oct. 21, 1975 to James E. Elliott, and to U.S. Pat. No. 3,947,888, issued Mar. 30, 1976 to Manfred H. Jarsen. In both of these patents, the read head is maintained substantially "rigid", while the disc is flexible and deemed "compliant" in maintaining a predetermined spacing between a disc surface and the read head. In such a system, the spacing is maintained by the creation of a hydrodynamic bearing between the videodisc and the foot of the read head. In both the Elliott and Jarsen patents, however, all forces acting to maintain the spacing constant are applied as forces to or are forces which react with the entire read head assembly. Furthermore, such prior art devices are useful only in systems employing "floppy" discs and would not be suitable for recording and/or playing back rigid discs, as in a disc mastering machine which records information on a coated substrate of thick glass. Both Elliott and Jarsen make reference to the need to assure appropriate spacing when dealing with the rigid videodisc or when dealing with a rigid master disc by applying various biasing forces brought to bear upon the read head assembly, urging it toward the surface of the disc.

In one such prior art apparatus, a positive pressure is applied to an annular chamber adjacent one end of a lens and housing assembly in which the lens assembly is telescopically mounted relative to the housing, and the positive pressure within the annular chamber acts on a flange provided at the forward end of the lens assembly, the air pressure entering the annular chamber being regulated by an air pressure regulator to provide the necessary biasing forces urging the lens assembly toward the videodisc spinning beneath it at 1800 RPM. Such a system has proven useful when recording or reading rigid videodiscs. One of the contributions of such prior art devices lies in the separating of the read head into two telescoping parts, the lens assembly and the housing, thereby making the low mass lens assembly responsive to quick axial adjustments so as to better maintain a constant spacing, and therefore constant focus, of the light beam reaching the disc.

In all of the above-referenced patents describing the prior art, some discussion and details have been given as regards to a servo system which responds to out-of-focus conditions and adjusts the biasing forces on the head accordingly. Furthermore, these references teach the need for providing a fluid pressure system responsive to the relative radial location of the read head to vary the pressure differential with radial location thereby maintaining a constant head-to-disc spacing independent of the relative surface speeds.

The present invention concerns the improvement in the support of the lens assembly relative to the housing, and this description will not dwell on the pneumatic servo system and its cooperation with a radial position sensing device, and it is presumed that one skilled in the art can adapt such subsystems to a recorder or player apparatus incorporating the concepts of the present invention.

A major drawback in the prior art head assemblies incorporating the aforementioned annular chamber concerns the chattering, or lateral and axial vibrations, of the lens assembly relative to the housing due to the turbulent airflow in the passageway leading from the annular chamber to the atmosphere. The chattering is caused by the short axial length of the flange relative to the gap between the outer periphery of the flange and the inner periphery of the housing.

To determine the cause of the vibrations set up in the prior art heads, an accelerometer was installed on the lens assembly. It was discovered that excessive vibration in both the axial and radial directions occurred, and the source of the vibrating forces appeared to center around the gap location of the journal bearing. Using known techniques to observe the streamlines of air passing through the gap, it was discovered that a separation layer existed close to the piston wall, and a substantial air turbulence was noted downstream of the gap exit. Apparently, the separation layer attaches and separates itself from the piston wall randomly creating vibration by adding to and subtracting from the pressure of the air source from the regulator.

Attempts at diminishing the turbulent air flow have been directed at lengthening of the flange resulting in a lengthening of the lens assembly, thereby adding undesirable mass and increasing the length of the free end of the lens assembly such that housing support for the lens assembly is a greater distance from such free end causing instability and inaccuracies in maintaining solid lateral support for the lens assembly within the housing. Obviously, it is desirable to have the bearing surfaces between the lens assembly and the housing extend the entire length of the lens assembly, and thus there arises a trade-off between axial bearing length and axial flange length, the former needed for solid lateral support of the lens assembly and the latter needed for minimizing air turbulence which causes lateral and axial vibrations of the flange and the integral lens assembly.

SUMMARY OF THE INVENTION

The present invention provides an improvement over the aforementioned lens assembly/housing arrangement in which substantial axial support for the lens assembly within the housing is obtainable simultaneously with eliminating the turbulent air flow by increasing the axial width verses gap width ratio, thereby avoiding the instability and vibration problems notable in prior art read head assemblies.

Basically, the invention concerns a method and means for supporting an axially movable head in spaced relationship to a moving information storage medium, the head having an inner assembly supported in slidable telescopic relationship to an outer housing. An annular chamber is provided between the ends of the housing, one longitudinal wall and one lateral wall of the annular chamber being integral with the inner assembly, and the opposite longitudinal wall and opposite lateral wall of the annular chamber being integral with the housing. A relatively fixed resilient biasing force is applied to the inner assembly relative to the housing to urge the inner assembly away from the storage medium. Air pressure in the annular chamber is regulated to provide a variable biasing force on the inner assembly relative to the housing in a direction opposite that of the relatively fixed biasing force.

In a preferred embodiment, the inner assembly is a lens assembly of an optical read/write head, although the principles of this invention can be applied to a variety of axially movable, fluid bearing heads. Air (or other fluid) is introduced under pressure in the annular gaps between the outer surface of the lens assembly and the inner surface of the housing. Such pressurized air is introduced on each axial side of the annular chamber to produce an air bearing journal between the telescoping members.

Pressure in the annular chamber is maintained at a level lower then that introduced into the annular gaps such that at least a portion of the air introduced into the gap on each axial side of the annular chamber is received by the annular chamber and exhausted therefrom. The regulator thus regulates the exhaust air pressure of the air leaving the annular chamber.

In a further aspect of the preferred embodiment, the housing is maintained in a relatively fixed relationship to the information carrying surface of the storage medium, and a supply of positive air pressure is applied to the space between the read head and the information storage medium to establish a hydrodynamic film creating the aforementioned relatively fixed resilient biasing force against which the force caused by pressure within the annular chamber is exerted.

IN THE DRAWINGS

DETAILED DESCRIPTION OF THE PREFERRED EMBODIMENTS

Figure 1:
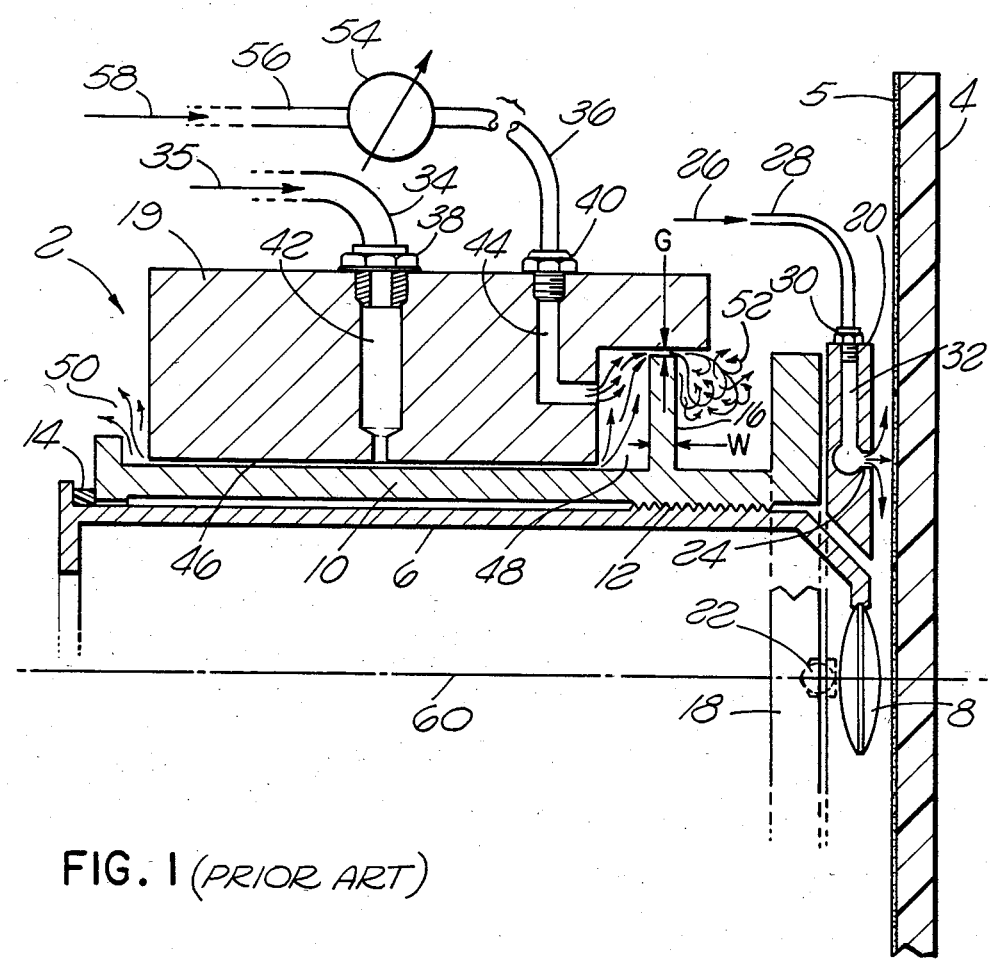
FIG. 1 is a cross sectional view of a prior art fluid read head showing an annular chamber at the end of the assembly.

FIG. 1 shows a typical prior art mastering record head 2 for recording information on the light responsive coating 5 of a videodisc 4. As critical as it is to maintain proper focus of a light beam on the information carrying surface of a prerecorded videodisc by a read head, even more critical tolerance limitations are placed on the record head assembly which originates the submicron width tracks in the light responsive coating 5 (typically a thin metal coating, an ablative plastic coating, or photoresist coating), deposited on the near surface of a glass substrate 4. In order to minimize frictional drag of the objective lens assembly relative to its housing, it has been found advantageous to pneumatically support the lens assembly and to incorporate pneumatic principles in effecting proper focus of the light beam on the videodisc surface.

In the prior art example of FIG. 1, for example, three different pneumatic systems acting in concert are shown.

An inner objective lens casing 6, carrying the objective optics represented by lens 8, is coupled to an outer objective lens casing 10 by screwthreads 12. The inner casing 6 is screwed into outer casing 10 until a hard rubber ring 14 is firmly sandwiched between flanges at the entrance end of the objective lens. An annular forcing flange 16 extends laterally near the exit end of the objective lens assembly, while an end flange 18 of the outer objective lens casing 10 serves as a mounting structure for receiving foot plate 20 pivotal about pivoting members 22 (one shown) typically in the form of a ball joint contained within recessed pockets in plate-like members 18 and 20. Such pivoting members 22 are placed on opposite sides of the objective lens assembly, being in quadrature to a pair of diametrically opposed air outlets 24 receiving a source of input air 26 through tube 28 mounting bushing 30 and distributing cavity 32. Typically, a fixed air pressure of 45 psi is sufficient to create a pneumatic thrust bearing between foot plate 20 and the rotating disc substrate 4. The air exiting openings 24 placed on opposite sides of foot plate 20 thus create a relatively fixed resilient biasing force on the lens assembly relative to the housing to urge the lens assembly away from the substrate 4. Any distortions in the flatness of the disc as it passes by the head causes foot plate 20 to pivot about balls 22 and thus maintain constant spacing as the defect passes by.

In a second of the pneumatic systems to be described, an inlet tube 34 receives positive air pressure indicated by arrow 35, the air passing through tube 34, mounting bushing 38, cavity 42, and into the spacing or gap between the objective lens outer casing 10 and housing 19.

Air exiting cavity 42 in housing 19 exits to the atmosphere near the entrance end of the objective lens at a region 50, and flows into an annular cavity 48 located at the exit end of the objective lens. The positive air pressure in gap 46 maintains an extremely low frictional pneumatic air bearing between casing 10 and housing 19.

Finally, a third of the pneumatic systems employed in the read head of FIG. 1 involves a tube 56 receiving positive air pressure indicated by arrow 58 leading to air pressure regulator 54. The air exiting regulator 54 is routed through tube 36, through mounting bushing 40, cavity 44, and into annular cavity 48 formed between flange 16 and housing 19. Adjusting the pressure regulator 54 changes the internal pressure within annular chamber 48, and this pressure acting between the fixed walls of housing 19 and the movable flange 16 defines a forcing piston arrangement for varying the axial position of the lens assembly within housing 19.

While the above-described prior art optical head is functional, the many drawbacks innumerated earlier are quite evident from FIG. 1. First, in a typical design, the width W of flange 16 is on the order of 0.640 inches, while the gap G has a span of 0.001 inches. As is well known in the art of fluid mechanics, the ratio of the gap dimension divided by the axial length of the gap (W in the device of FIG. 1) determines whether or not the fluid passing through the gap will exit the gap in laminar or turbulent flow. Analytical calculations can be made using what is referred to as the Reynolds criterion to produce a number above which substantially turbulent flow will result and another number below which substantially laminar flow will result. Reynolds numbers are dependent also on the viscosity and density of the fluid involved in the system, and since the present invention is concerned with the use of air as an operative fluid, and since the dimension of the gap G will naturally be made as small as possible without danger of flange 16 touching the inner wall of housing 19 due to manufacturing tolerances and uncontrollable lateral vibrations of the lens assembly, only the dimension W is variable to change the Reynolds number so as to obtain a smallest Reynolds number possible within the design constraint of the system. The Reynolds number equation in its simplest form can be stated as:

$$Re = v/d \cdot G/W,$$

where V and d are, respectively, the viscosity and density of the fluid involved, G is the gap span, and W is the axial length of the gap.

Attempts in the prior art to increase W, while advantageously reducing the Reynolds number, produces other, deleterious effects. First, by making W larger, a substantial amount of weight is added to the movable lens assembly reducing its responsiveness to quick changes called for by the focus servo system. Secondly, by increasing W, the amount of journal bearing surface between outer casing 10 and housing 19 is lessened, allowing the free end of the lens assembly to project further and further from the housing resulting in an obvious reduction in stability of the pneumatic journal bearing.

Figure 2:
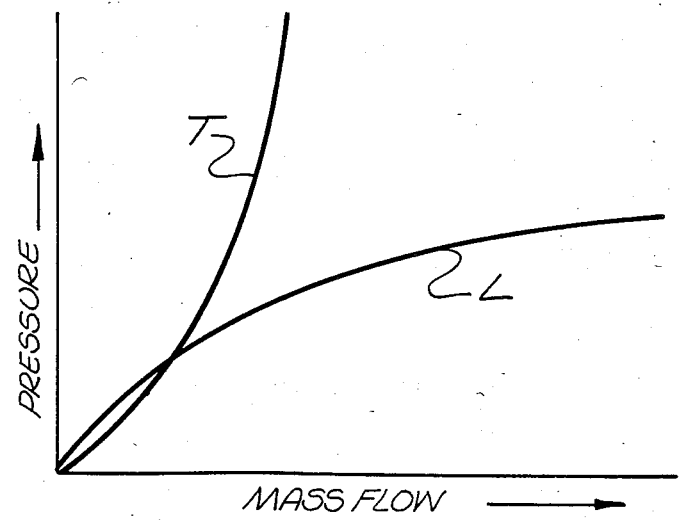
FIG. 2 is a plot of pressure versus mass flow in turbulent and laminar flow environments.

Furthermore, with the type of geometry involved in the head assembly of the type to which this invention is related requires a ratio of W to G to be on the order of 500 or more. Experiments have shown that a ratio of W to G over 1000 results in substantially laminar flow, while ratios of W to G under 100 result in substantially turbulent flow. This can be appreciated by reference to FIG. 2 where it is indicated that to produce a greater mass flow in a turbulent (T) environment requires pressures which vary substantially as the square of the mass flow desired. On the other hand, in a laminar flow environment, increased mass flow varies as the square root of the pressure. Accordingly, in order to avoid a turbulent situation at exit of the gap G in FIG. 1, the ratio of W to G must exceed 100, and preferably should exceed 500. In a typical prior art device, the ratio of W to G is 40. Thus, to increase the width of flange 16 to obtain a ratio of 500 or more, practicality precludes the making of W large enough to produce a W to G ratio of 500 or more.

It is surmised that the reason for putting the gap and piston at the end of the lens assembly in the prior art is that it is easier to design and produce a straight bore for an air bearing, since the journal bearing gaps are held to extremely tight tolerances to produce a gap 46 on the order of 0.0003 inches.

Figure 3:
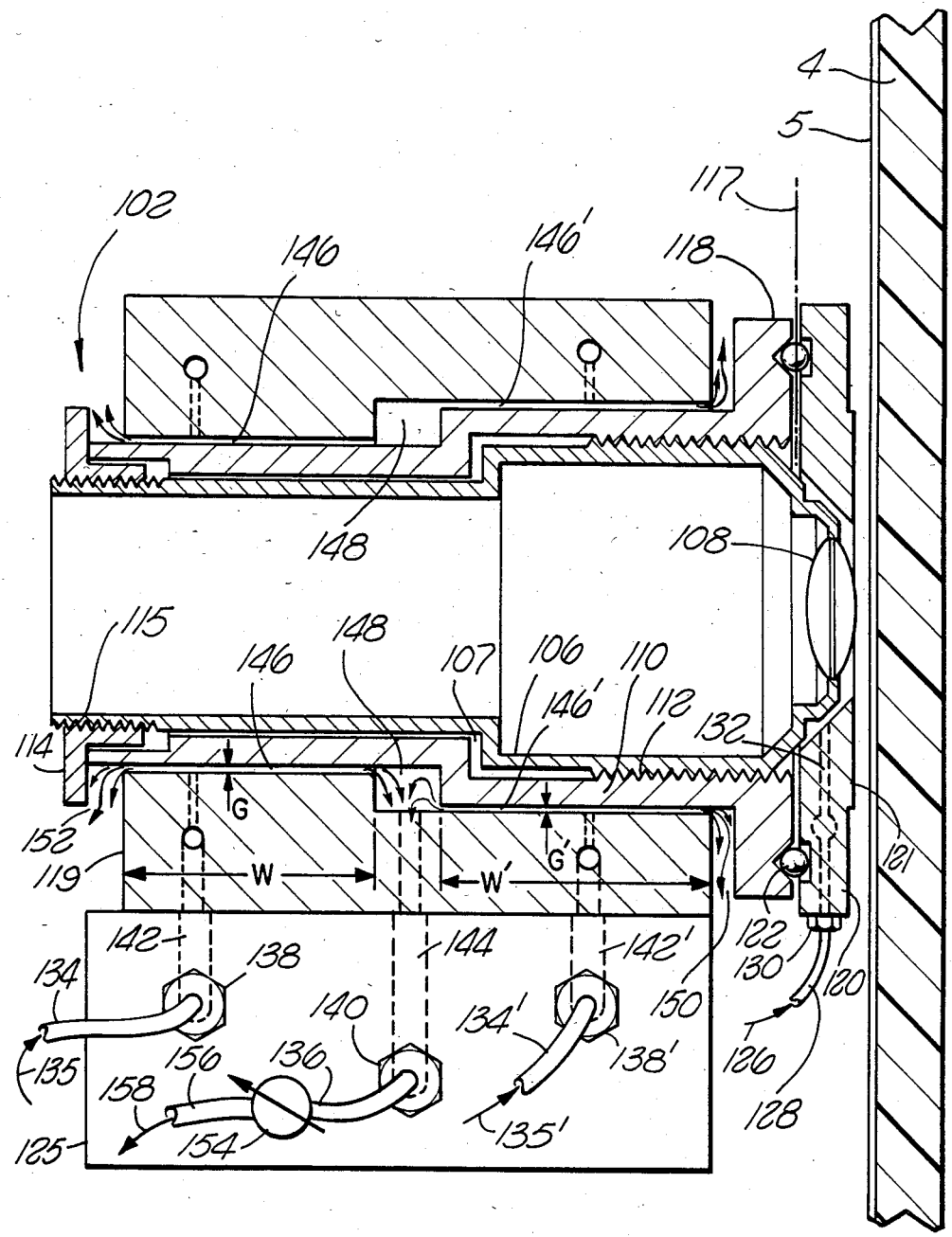
FIG. 3 is a cross sectional view of the improved read head according to the present invention showing the placement of the annular chamber at the approximate center axially of the lens assembly and housing.
Figure 4:
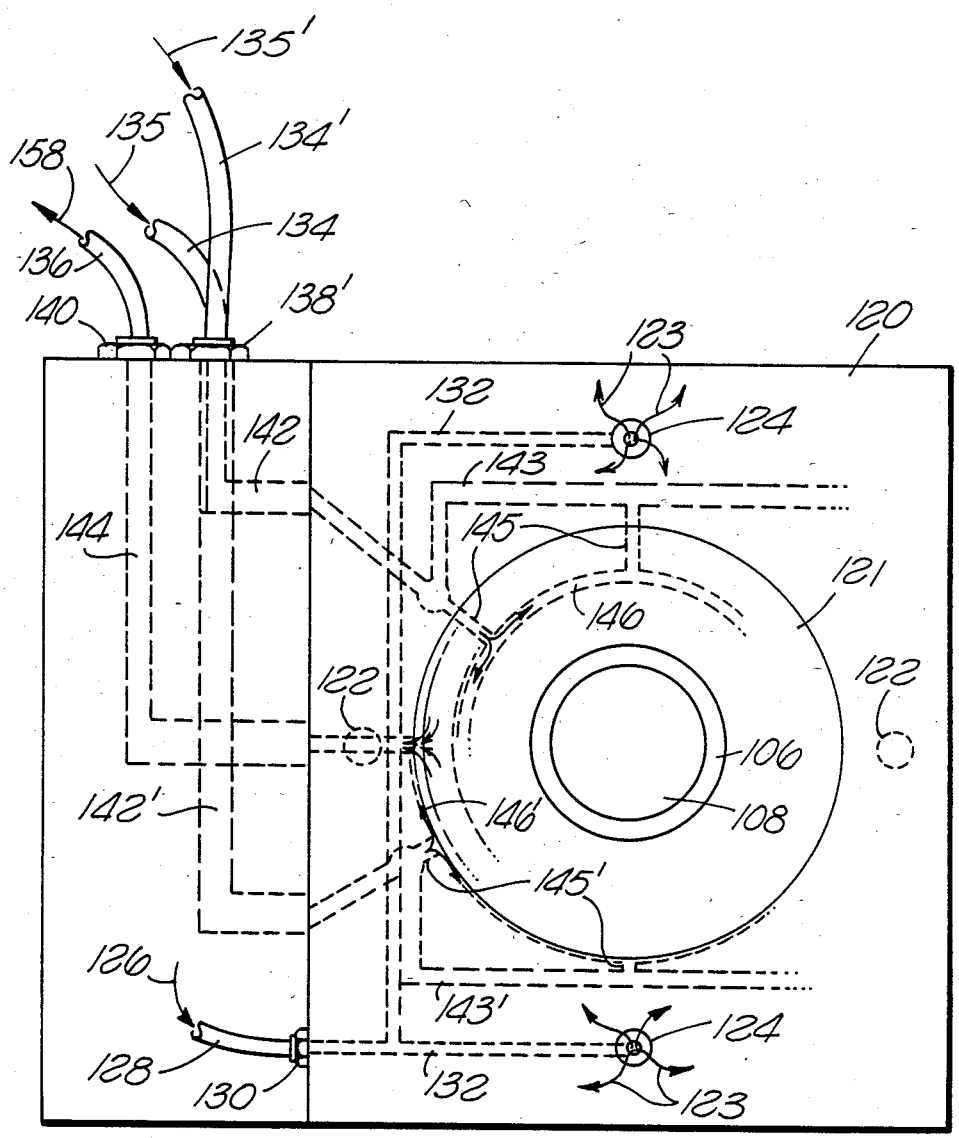
FIG. 4 is a bottom view of the invention shown in FIG. 3 detailing some of the fluid ducting and distribution patterns within the read head assembly.

The construction of an optical head in accordance with the principles of the present invention can be appreciated by reference to FIGS. 3 and 4. In FIG. 3, the lens assembly is similarly constructed to that shown in FIG. 1. That is, an inner lens casing 106 carries objective lens 108, and is threadedly received by outer casing 110. The two casings are locked together by a retainer bushing 115 having a lateral flange 114 bearing against the entrance end of the outer lens casing 110. Outer casing 110 has an end flange 118 facing a surface of foot plate 120 pivotally mounted with respect to end flange 118 about axis 117 on balls 122. A central land portion 121 surrounds the objective lens 108 leaving the remainder of the outer surface of foot plate 120 with a recessed area within which air indicated by arrows 123 in FIG. 4 exit an opening 124 in the manner described in connection with the same function of the thrust bearing of FIG. 1.

As in FIG. 1, a source of positive air pressure indicated by arrow 126 enters a tube 128 through mounting bushing 130 and through a distribution cavity 132 in foot plate 120. The function and operation of the thrust bearing is prior art knowledge and will not be detailed in this description.

One important aspect of the invention lies in the provision of the annular chamber 148 near the axial center of the head assembly. Locating chamber 148 to the center of the assembly is not a mere extension of the placement of the chamber 48 in FIG. 1, since other considerations, such as the aforementioned loss of journal bearing surface, are involved. Thus, to accommodate the central placement of chamber 148, the outer peripheral surface of the lens casing 110 and the inner peripheral surface of the housing 119 are provided with shoulders making the parts of both the lens assembly and housing on either side of the annular chamber 148 of different diameters. This combination of modifications results in a pair of pneumatic journal bearings, 146, 146' one on either side of chamber 148, thereby preserving the integrity of the journal bearing by keeping it a substantial length relative to the length of the lens assembly. Simultaneously, as can be appreciated by reference to FIG. 3, the lens 108, i.e. the free end of the lens assembly, is positioned much closer to the end of the housing 119 so as to provide support for the lens assembly for substantially the entire length of the housing.

Moreover, and more importantly, placing the annular chamber 148 in the center of the optical head results in a high value for the ratio of W to G. First, since G is the dimension of the pneumatic journal bearing, this dimension is small, on the order of 0.0003 inches, and the axial length W and W' (FIG. 3) of the gap may be on the order of 1 inch or more. Accordingly, W to G ratios exceeding 3000 are possible, and even with a 0.001 inch gap, W to G ratios exceeding 1000 can be realized without sacrificing good design principles. As mentioned earlier, W to G ratios exceeding 1000 result in laminar flow at the exit ends of the gap, thereby totally eliminating the chattering of the lens assembly common with prior art structures.

With reference to FIGS. 3 and 4, sources of positive air pressure indicated by arrows 135 and 135' force air through tubes 134 and 134', through mounting bushings 138 and 138', through distribution cavities 142 and 142', and into the housing 119. All of the external connections and routing of air to housing 119 are shown in FIG. 3 to take place within manifold 125.

Air under positive pressure in passageways 142 and 142' is distributed to the central portion of the gaps G and G' as seen in FIG. 3. After entering gaps G, G', the air providing a pneumatic journal bearing within gaps 146, 146', exit both ends of the gap, one end of each gap being exhausted to the atmosphere shown at 150 and 152, and other end of the gap exhausting into annular chamber 148. Contrary to the design of prior art head assemblies, the air in chamber 148 is maintained at a pressure lower than that provided for the journal bearing, such that a pressure regulator 154 regulates the exhaust air pressure and maintains the appropriate forces acting between the housing 119 and casing 110 in the fashion of a pneumatic forcing piston to balance the oppositely directed forces against the lens assembly provided by the pneumatic thrust bearing between foot plate 120 and substrate 4. The exhaust air leaving chamber 148 is routed through distribution passageway 144, through mounting bushing 140, pipe 136, regulator 154, exit pipe 156, and to the atmosphere as shown at arrow 158.

FIG. 4 is drawn to show one possible routing arrangement for the air passageways supplying gaps 146 and 146', annular chamber 148, and passageways 132 for the thrust bearing. In order to avoid confusion, not all of the air passageways are shown in FIG. 4. An example of air distribution around the periphery of gaps 146 and 146' is illustrated in FIG. 4 by the provision of radially directed passageways 145 and 145' and feeder lines 143 and 143'.

While only a simplified air distribution system for the pneumatic journal bearing has been described, an improvement in the mechanism for distributing air into the bearing passageway may be provided in the manner described by U.S. Pat. No. 4,339,814, issued July 13, 1982 to Lawrence S. Canino. The Canino '814 patent describes a pneumatic journal bearing in which pressurized air is supplied through a plurality of slotted flow paths to the support interface between the journal and a spindle housing for supporting the journal for relatively high speed rotation on a cushion of air.

Figure 5:
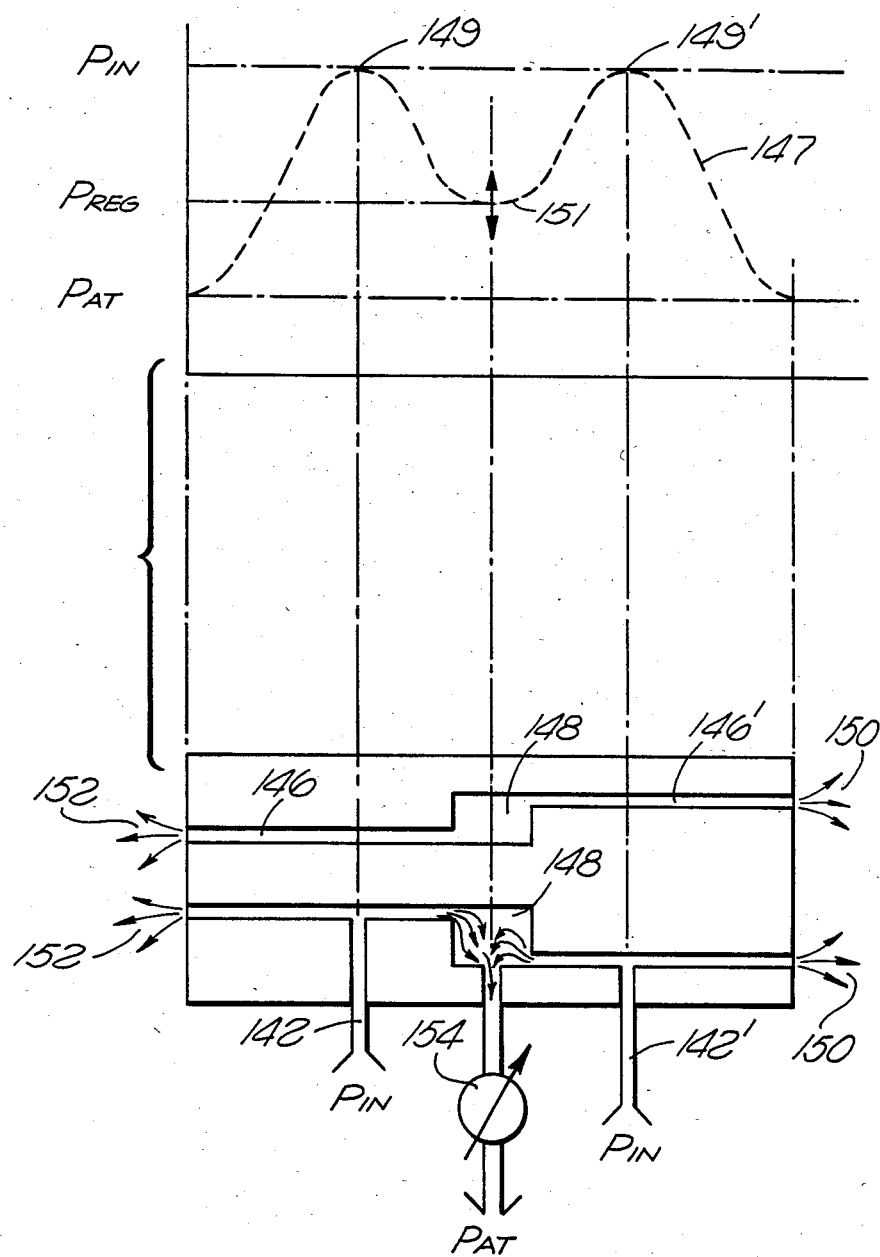
FIG. 5 shows a graphical representation of the pressure at axial points along a corresponding schematic model of the invention according to the invention.

FIG. 5 shows a schematic representation of the principles of the invention at the bottom half therof and a graph of the pressure at the corresponding axial locations along the head assembly in the upper half of FIG. 5. As can be readily observed, air exiting the ends of the assembly at 150 and 152 are at atmospheric pressure ($P_{AT}$), while the peak pressures in the system occur in the points in gaps 146 and 146' where input pressure ($P_{IN}$) enter passageways 142 and 142'. At the axial location of the annular chamber 148, the pressure in the system drops to the value determined by the setting of pressure regulator 154. This is shown in FIG. 5 as the pressure dip point 151 of waveform 147. The graph of FIG. 5 illustrates the higher pressure 149, 149' of the journal bearing air pressure sources relative to the pressure maintained within chamber 148 and, of course, atmospheric pressure at the ends of the assembly.

In a typical operational assembly, input pressure in passageways 142 and 142' may be on the order of 28 psi, while the exhaust pressure adjusted by regulator 154 maintains a pressure in chamber 148 of approximately 10 psi resulting in a net force against the lens assembly relative to the housing of about 1 pound.

There has been described a method and means for supporting an optical head in fixed, but adjustable, spaced relationship to a moving information storage member. Since such storage members, typically discs, are not flat, the lens assembly must move axially to maintain a constant spacing and thereby maintain constant focussing of the light beam on the disc. Due to the rattling of the lens assembly 6, 10 within its housing 19 in prior art devices, irregular track spacing and irregular track shapes result in poor tracking by the read head and produce cross talk, tracking problems, and the like in a playback system. The present invention has eliminated the rattling of the lens assembly by a head design which produces laminar air flow throughout the entire system. What has been presented is a preferred embodiment of the invention, and it is clear that modifications and variations will be apparent to those skilled in the art and yet remain within the scope of the present invention. Accordingly, the present invention is to be limited only by the scope of the claims appended hereto.

I claim:

1. A method for supporting an optical read head in spaced relationship to a moving information storage medium, the read head having a lens assembly movable within a housing, said method comprising the steps of:

supporting by an air bearing the lens assembly slidable within the housing, an annular air exhaust chamber being provided between the ends of said housing, one longitudinal wall and one lateral wall of the annular chamber being integral with the lens assembly, and the opposite longitudinal wall and opposite lateral wall of the annular chamber being integral with the housing;

introducing air under pressure into annular gaps formed between an outer surface of the lens assembly and an inner surface of the housing on each side of the annular chamber to produce an air bearing journal between the members;

providing a relatively fixed resilient biasing force on the lens assembly relative to the housing to urge the lens assembly away from the storage medium; and regulating the air pressure exhausting the annular air exhaust chamber to provide a variable biasing force on the lens assembly relative to the housing in a direction opposite that of said relatively fixed biasing force.

2. A method for supporting an optical read head in spaced relationship to a moving information storage medium, the read head having a lens assembly movable within a housing, said method comprising the steps of:

supporting the lens assembly telescopically slidable within the housing, an annular chamber being provided between the ends of said housing, one longitudinal wall and one lateral wall of the annular chamber being integral with the lens assembly, and the opposite longitudinal wall and opposite lateral wall of the annular chamber being integral with the housing;

providing a relatively fixed resilient biasing force on the lens assembly relative to the housing to urge the lens assembly away from the storage medium;

regulating the air pressure in the annular chamber to provide a variable biasing force on the lens assembly relative to the housing in a direction opposite that of said relatively fixed biasing force;

said supporting step including introducing air under pressure into annular gaps formed between an outer surface of the lens assembly and an inner surface of the housing on each side of the annular chamber to produce an air bearing journal between the telescoping members;

maintaining the pressure in the annular chamber at a pressure lower than the pressure introduced into said annular gaps, and wherein:

at least a portion of the air introduced to said gap on each axial side of the annular chamber is received by the annular chamber and exhausted therefrom; and said regulating step includes regulating the exhaust air pressure of the air leaving the annular chamber.

3. The method as claimed in claim 2, including the step of maintaining the housing in a fixed relationship relative to the information carrying surface of the storage medium, and wherein said providing step includes supplying a source of positive air pressure to the space between the read head and the information storage medium to produce said relatively fixed resilient biasing force.

4. The method as claimed in claim 2, wherein the ratio of the axial length of each annular gap to the width of the gap is maintained at a value greater than 500.

5. Apparatus for supporting an optical read head in spaced relationship to a moving information storage medium, comprising:

a lens assembly means for focussing a beam of light onto an information carrying surface of an associated storage medium;

a lens assembly housing supporting said lens assembly in slidable relationship thereto;

wall means defining an annular air exhaust chamber between the ends of said housing, said wall means including a first longitudinal wall and first lateral wall integral with said lens assembly, and a second longitudinal wall and second lateral wall, opposite said first longitudinal and lateral walls, integral with said housing;

means for introducing air under pressure between the assembly and the housing to produce an air bearing journal between said lens assembly and said housing;

biasing means for providing a relatively fixed resilient biasing force on said lens assembly relative to said housing to urge said lens assembly away from the storage medium; and air pressure regulating means for regulating the air pressure exhausting said annular air exhaust chamber and providing a variable biasing force on said lens assembly relative to said housing in a direction opposite that of said relatively fixed biasing force.

6. The apparatus as claimed in claim 5, wherein a space is provided between an outer surface of said lens assembly and an inner surface of said housing, thereby defining an annular gap on each side of said annular chamber.

7. The apparatus as claimed in claim 5, wherein adjusting the air pressure setting of said air pressure regulating means alters the resultant reactive forces acting on said lens assembly by the relatively fixed biasing force of said biasing means and said variable biasing force, thereby producing a net difference force acting to move said lens assembly axially relative to said housing to affect the focussing of said light beam on the storage medium.

8. Apparatus for supporting an optical read head in spaced relationship to a moving information storage medium, comprising:

a lens assembly means for focussing a beam of light onto an information carrying surface of an associated storage medium;

a lens assembly housing supporting said lens assembly in slidable telescopic relationship thereto;

wall means defining an annular chamber between the ends of said housing, said wall means including a first longitudinal wall and first lateral wall integral with said lens assembly, and a second longitudinal wall and second lateral wall, opposite said first longitudinal and lateral walls, integral with said housing;

biasing means for providing a relatively fixed resilient biasing force on said lens assembly relative to said housing to urge said lens assembly away from the storage medium;

air pressure regulating means for regulating the air pressure in said annular chamber, thereby providing a variable biasing force on said lens assembly relative to said housing in a direction opposite that of said relatively fixed biasing force;

a space being provided between the outer surface of said lens assembly and the inner surface of said housing, thereby defining an annular gap on each side of said annular chamber, and further comprising;

means for introducing air under pressure into each said annular gap to produce an air bearing journal between said lens assembly and said housing; and said air pressure regulating means including means for maintaining the pressure in said annular chamber at a pressure lower than the pressure introduced into said annular gaps, at least a portion of the air introduced to said gap on each axial side of said annular chamber being received by said annular chamber and exhausted therefrom through said regulating means, said regulating means thus regulating the exhaust air pressure of the air leaving said annular chamber.

9. The apparatus as claimed in claim 8, including:

mounting means maintaining said housing in a fixed relationship relative to the information carrying surface of the storage medium; and means for supplying a source of positive air pressure to the space between said read head and the information storage medium to produce said relatively fixed resilient biasing force.

10. The apparatus as claimed in claim 8, wherein the axial lengths of the mating surfaces of the lens assembly and the housing relative to the widths of the corresponding gaps defined thereby on each axial side of said annular chamber are such that the ratio of the axial length of each said annular gap to the width of the gap is maintained at a value greater than 500.

11. The apparatus as claimed in claim 8, wherein each said gap leads in one axial direction to said annular chamber and in the opposite axial direction to an opening at atmospheric pressure.

12. The apparatus as claimed in claim 8, wherein said annular chamber is located substantially centrally of said read head in the axial direction.

13. The apparatus as claimed in claim 12, wherein the axial lengths of said annular gaps are substantially equal.

14. The apparatus as claimed in claim 8, wherein said means for introducing air into each said annular gap is positioned to introduce the pressurized air at approximately the axial center of the respective gap.

15. Apparatus for supporting an optical read head in spaced relationship to a moving information storage medium, comprising:

a lens assembly means for focusing a beam of light onto an information carrying surface of an associated storage medium;

a lens assembly housing supporting said lens assembly in slidable telescopic relationship thereto;

wall means defining an annular chamber between the ends of said housing, said wall means including a first longitudinal wall and first lateral wall integral with said lens assembly, and a second longitudinal wall and second lateral wall, opposite said first longitudinal and lateral walls, integral with said housing;

biasing means for providing a relatively fixed resilient biasing force on said lens assembly relative to said housing to urge said lens assembly away from the storage medium;

air pressure regulating means for regulating the air pressure in said annular chamber, thereby providing a variable biasing force on said lens assembly relative to said housing in a direction opposite that of said relatively fixed biasing force; and wherein said wall means is formed by a first shoulder located between two axial parts of different diameters of said lens assembly and a second shoulder located between two cooperating axial parts of different diameters of said housing, said annular chamber being formed by the space between said first and second shoulders.

16. A method for supporting an optical read head in spaced relationship to a moving information storage medium, the read head having a lens assembly movable within a housing, an annular chamber being provided between the ends of said housing, at least one wall of the annular chamber being integral with the lens assembly, and at least one wall of the annular chamber being integral with the housing;

the method comprising the steps of:

introducing a fluid under pressure between the lens assembly and the housing and exhausting the fluid from the annular chamber;

providing a relatively fixed resilient biasing force on the lens assembly relative to the housing to urge the lens assembly away from the storage medium; and regulating the pressure of fluid exhausting the annular chamber to provide a variable biasing force on the lens assembly relative to the housing in a direction opposite that of said relatively fixed biasing force.

17. Apparatus for supporting an optical read head in spaced relationship to a moving information storage medium, comprising:

a lens assembly through which a beam of light may be focussed onto the information carrying surface of the storage medium;

a lens assembly housing supporting said lens assembly in slidable relationship thereto;

wall means defining an annular chamber between the ends of said housing, said wall means including at least one wall integral with said lens assembly and at least one wall integral with said housing;

fluid means for introducing a fluid under pressure between the lens assembly and the housing and forming a fluid bearing;

biasing means for providing a relatively fixed resilient biasing force on said lens assembly relative to said housing to urge said lens assembly away from the storage medium; and pressure regulating means for regulating the pressure of fluid exhausting said annular chamber and providing a variable biasing force on said lens assembly relative to said housing in a direction opposite that of said relatively fixed biasing force.

* * * * *